United States Patent Office 2,865,672
Patented Dec. 23, 1958

2,865,672

TANK WASHING APPARATUS

Paul André Jean-Marie Guinard, Saint Cloud, France, assignor to Etablissements Pompes Guinard, Saint Cloud (S. et O.), France, a corporation of France Application February 21, 1956, Serial No. 567,001

2 Claims. (Cl. 299—63)

The present invention relates to a device adapted to deliver a liquid under pressure on the inner faces of a closed tank, particularly for washing cisterns with water under pressure, and specially the tanks of oil-steamers. A known type of such apparatus comprises a rotatable cylindrical member, several cranked nozzles with a common liquid feed tube journaled in and at right angles to said cylindrical member, and geared means for imparting the rotation of said nozzles about their feed tube to the cylindrical member.

As the nozzles of this known apparatus rotate in a plane which is parallel to the axis of the rotating cylindrical member, and which itself rotates about said axis, the jets of liquid delivered by the nozzles uniformly wash all the inner faces of the tank in which the apparatus is disposed. Nevertheless, liquid under a very high pressure cannot be sprayed by means of this prior art apparatus, because the pressure of said liquid would exert an important force on the only one of both ends of the cylindrical member which is closed, the other end of said cylindrical member being open as a liquid inlet. This force would then prevent the cylindrical member from rotating freely in its stationary bearing.

One object of the present invention is to provide a device adapted to deliver a liquid under high pressure to the inner faces of a closed tank, particularly for washing cisterns, and especially oil tanks, which comprises a rotatable cylindrical member, a feed tube journaled in said member so that their axes are perpendicular to each other, several offset nozzles connected to said feed tube so that the outflow of liquid therefrom imparts to said nozzles and feed tube a rotation around the axis of said feed tube, and geared-means for imparting the rotation of said nozzles and feed tube to the cylindrical member, each end of the cylindrical member being closed, and lateral apertures being provided as liquid inlets on the periphery of said feed tube and of said cylindrical member, whereas the offset nozzles are laterally connected to said feed tube.

According to this main feature of the invention, the forces exerted by pressure on the end walls of said cylindrical member do counterbalance each other, and its free rotation is consequently ensured.

The invention provides also the possibility of varying the speed of the apparatus by moving the nozzles on their support so as to modify the distance of their offset end portions with respect to the axis of the feed tube.

An embodiment of a device according to the invention, comprising as speed limiter a volumetric gear pump is described hereafter and illustrated in the annexed drawing.

Figures 1, 2:
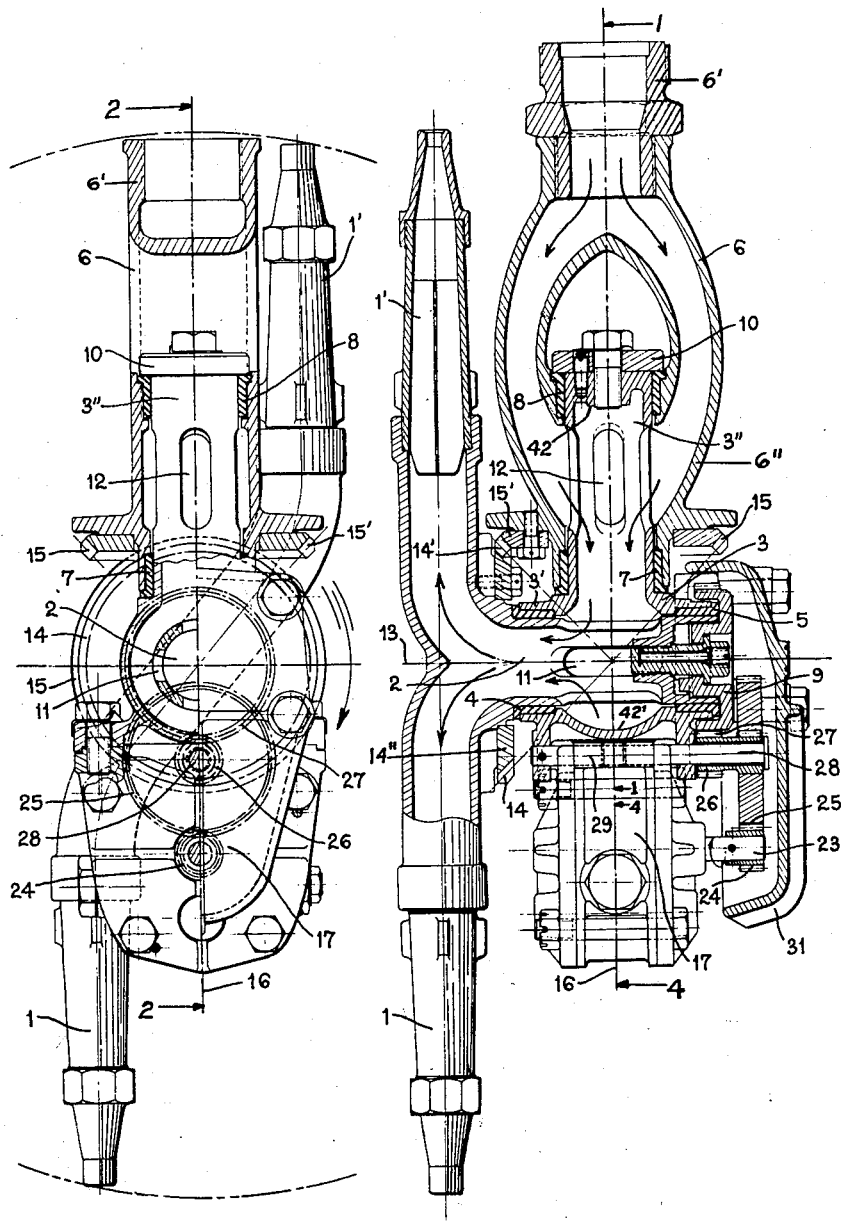
Figure 1 is a rear view, partly in section, along the line 1—1 of Figure 2.
Figure 2 is a side view, partly in section along the line 2—2 of Figure 1.

In Figures 1 and 2, the two offset nozzles of the apparatus are designated 1, 1'. Each nozzle includes internal spiders to increase the efficiency of the jet which becomes thereby similar to the efficiency of a straight pipe four times longer than the nozzle itself. This results from the fact that such spiders prevent the water flow from becoming turbulent and, consequently, causing a loss of pressure.

The two nozzles are connected with a hollow feed tube 2 which is perpendicular to their plane and constitutes their axis of rotation. This hollow tube is fitted in the horizontal arm 3' of a T-shaped hollow member 3 and is journaled in seats at both ends of the arm 3' with the interposition of carbon bearings, 4, 5. The vertical arm 3" of the T-shaped member 3 is fitted in the delivery end 6" of the bifurcated stationary tube 6 where it is journaled in two seats with the interposition of carbon bearings 7, 8. The hollow feed tube 2 and the arm 3" of the T-shaped member are obturated with plugs 9, 10 which in same time form axial abutments. In addition, in the tubes 2, 3", are provided oblong slots, such as 11 and 12, uniformly allotted on their periphery and through which enters the water flowing under pressure in the bifurcated stationary tube 6, as shown by the arrows of Figure 2. Tube 6 is connected to a source of supply, not shown, through neck 6'.

This arrangement secures the balance of the pressures on the bottoms and thereby the lack of axial thrusts. The pressure forces respectively applied on the wall 42' obturating the upper end of member 3 and on the wall 42 obturating its lower end have resultants which are equal and opposed to each other, being parallel to the axis 16 of member 3; these two resultant forces consequently counterbalance each other and exert no hindering action on bearings 7 and 8.

The torques of reaction of the offset nozzles drive in rotation the hollow tube 2 and the nozzles 1, 1' themselves about the horizontal axis 13.

The hollow tube 2 drives in its rotation a ring 14" made integral with said tube and which is provided with conical teeth 14, 14' meshing with a similar ring 15, 15' fitted at the end of the bifurcated tube 6 and concentric with the vertical axis of the arm 3" of the T-shaped member 3. As this ring 15 is stationary, the T-shaped member 3 is driven in rotation about the vertical axis 16 of the arm 3" and transmits its motion to the hollow tube 2 and to the nozzles 1, 1'.

Figure 3:
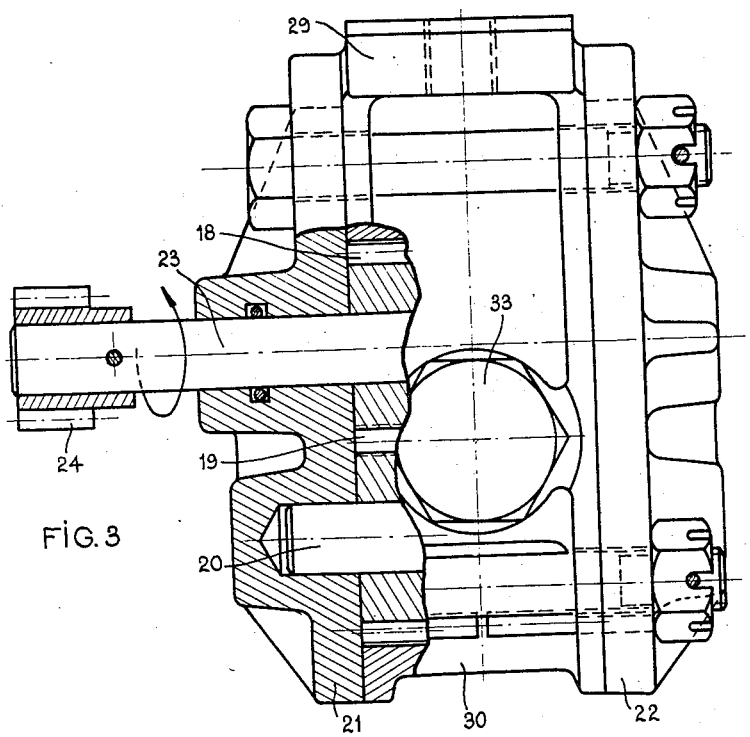
Figure 3 is a side view of the speed limiter, partly in section, along the line I—I and at a greater scale.
Figure 4:
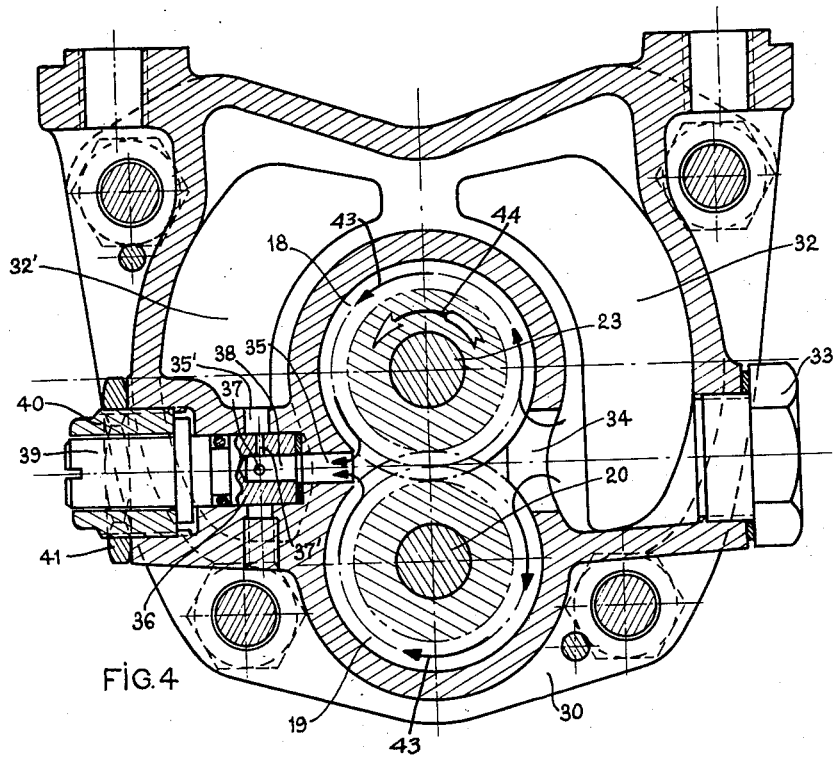
Figure 4 is a front view of the speed limiter in section along the line 4—4 of Figure 1 and at a greater scale.

The Figures 3, 4, are detailed views of the braking pump, designated 17 in Figures 1 and 2. This pump consists essentially in a pair of pinions, 18, 19; the pinion 19 is keyed upon a shaft 20 which is journaled freely in the cheeks 21, 22 of the pump and the pinion 18 is keyed upon a shaft 23 driven in rotation by the feed tube 2 through the multiplying gear train 24, 25, 26, 27 (see Figures 1 and 2), the pinion 24 being keyed upon the shaft 23 of the pump, the pinion 27 being integral with the bolt 9 obturating the end section of the hollow tube 2, the intermediate pinions 25 and 26 being keyed upon the same shaft 28, journaled in 29 in the casing 30 of the pump. The gear-train is itself sheltered by a very strong casing 31.

The casing 30 of the pump contains a tank 32, 32' which is filled up, through the mouth and plug 33 with a fluid oil having a viscosity ranging from 5° to 10° E at the ambient temperature. This oil is sucked by the pump through the wide opening 34 then urged by the teeth of the pinions 18 and 19 as shown by the arrows 43, said pinions being rotated in the direction of the arrow 44, and finally forced into the tank portion 32' through a duct 35, 35';

said oil discharged in the tank portion 32' passes in the tank portion 32, where it is sucked again through the opening 34, so that the pump works in a closed circuit; a throttle member 36 is arranged in this duct with three ports such as 37, 37', of different diameters, for instance 1, 1.5, 2 mm. connecting the central bore 38 in the body of the throttle member 36 with the duct 35'. These ports are arranged perpendicularly to each other in a same cross section of the body 36 and the rotation of a quarter turn or a half turn of the control stem 39, after unscrewing the counter nut 41 and the nut 40, allows either one of these ports to be put into service.

The braking torque generated by the resistance opposed by the calibrated port 37 of the throttle member 36 to the flow of the oil increases rapidly with the speed of the driven pump and finally imparts to the reaction nozzles a maximum running speed which depends on the diameter of the port of the throttle member and on the fluidity of the oil.

As no part in the apparatus revolves at a speed greater than from 25 to 40 turns in a minute, there is practically no wear.

To clean for instance a large tank having only an upper opening the device is connected through the upper part of the body 6 with the pipe delivering the water under pressure and is progressively lowered in the tank at the end of this pipe.

What I claim is:

1. A tank cleaning device comprising a bifurcated stationary tube having a supply end and a delivery end and adapted to be connected to a source of supply of washing liquid, a hollow T-shaped member having vertical and horizontally extending arms disposed at right angles to each other, said horizontal arm having an open end and an obturated end, said vertical arm having a plurality of lateral apertures and being rotatably and water-tightly engaged in the delivery end of said bifurcated tube, two diametrically opposed reaction nozzles, a hollow feed tube disposed in said horizontal arm, one end of said feed tube being connected to said nozzles and the other being obturated, said feed tube being rotatably water-tightly mounted in said horizontal arm and being provided with openings intermediate its ends, a movable toothed ring secured to said feed tube, a stationary toothed ring disposed around the delivery end of said bifurcated tube so as to mesh with said movable toothed ring, volumetric geared pump means secured to said T-shaped member and adapted to rotate therewith, said volumetric geared pump being further adapted to work in a closed circuit, a throttle member in said volumetric pump having a plurality of differently calibrated ports adapted to limit and adjust the delivery of said pump, and a multiplying gear train connecting said feed tube with the shaft of said pump and adapted to transmit the rotation of said feed tube to the shaft of said pump.

2. A tank cleaning device according to claim 1 wherein said vertical arm of said hollow T-shaped member has both ends closed, whereby the pressure forces exerted respectively on both closed ends of said vertical arm counterbalance each other, so as not to hinder the rotation of the T-shaped member in the delivery end of said bifurcated tube.

References Cited in the file of this patent

UNITED STATES PATENTS

| | | |
|---|---|---|
| 2,029,788 | Ostling | Feb. 4, 1936 |
| 2,078,568 | George | Apr. 27, 1937 |
| 2,661,241 | Veneziano | Dec. 1, 1953 |
| 2,681,250 | Metcalf | June 15, 1954 |